(12) United States Patent
Ueno et al.

(10) Patent No.: US 8,269,662 B2
(45) Date of Patent: Sep. 18, 2012

(54) INFORMATION PROCESSING SYSTEM, INFORMATION PROCESSING DEVICE AND METHOD, REMOTE CONTROL, PROGRAM, AND RECORDING MEDIUM

(75) Inventors: Miki Ueno, Tokyo (JP); Tsuyoshi Oobayashi, Tokyo (JP); Nobuo Motohashi, Kanagawa (JP); Toshihiko Suzuki, Tokyo (JP); Ayumi Mizobuchi, Tokyo (JP); Taro Takita, Tokyo (JP); Kazunori Suto, Miyagi (JP)

(73) Assignee: Sony Corporation (JP)

( * ) Notice: Subject to any disclaimer, the term of this patent is extended or adjusted under 35 U.S.C. 154(b) by 907 days.

(21) Appl. No.: 12/229,914

(22) Filed: Aug. 28, 2008

(65) Prior Publication Data

US 2009/0058709 A1 Mar. 5, 2009

(30) Foreign Application Priority Data

Sep. 4, 2007 (JP) ................................ P2007-229539

(51) Int. Cl.
*H04L 17/02* (2006.01)

(52) U.S. Cl. ............ 341/176; 725/47; 725/52; 725/133; 725/141; 348/734; 348/705; 398/106; 340/13.24

(58) Field of Classification Search .................. 341/176; 725/47–50, 52, 59, 133, 141, 38; 348/734, 348/705–706; 398/106; 340/13.24, 13.36, 340/12.22, 12.23
See application file for complete search history.

(56) References Cited

U.S. PATENT DOCUMENTS

| | | | |
|---|---|---|---|
| 6,930,661 B2 * | 8/2005 | Uchida et al. .................... 345/87 |
| 7,782,407 B2 * | 8/2010 | Hicks ............................. 348/734 |
| 2003/0038849 A1 * | 2/2003 | Craven et al. ................. 345/864 |
| 2005/0110652 A1 * | 5/2005 | Becker et al. ............ 340/825.72 |
| 2005/0253808 A1 | 11/2005 | Yoshida |
| 2006/0272001 A1 | 11/2006 | Miyazawa et al. |
| 2007/0011708 A1 | 1/2007 | Wu |
| 2007/0130607 A1 * | 6/2007 | Thissen et al. ................ 725/132 |
| 2007/0195195 A1 * | 8/2007 | Hicks ............................ 348/552 |

(Continued)

FOREIGN PATENT DOCUMENTS

JP 5-252462 A 9/1993

(Continued)

OTHER PUBLICATIONS

European Search Report, EP 08 16 2932.

*Primary Examiner* — Patrick Salce
(74) *Attorney, Agent, or Firm* — Lerner, David, Littenberg, Krumholz & Mentlik, LLP

(57) ABSTRACT

An information processing device that transmits and receives data to and from a device to which external devices are connected and that processes a signal transmitted from a remote control including buttons to which codes are allocated, the codes being different for each of the external devices, includes a storing unit configured to store, for each of the external devices, a table representing a relationship between the codes and the buttons; a generating unit configured to generate data of a graphical user interface in which a picture of the remote control and button names corresponding to the codes are located; and a control unit configured to perform, if a button included in the remote control to be used for issuing a command to change the button names has been operated, control such that the codes are changed while the table is referred to and that the button names are changed.

19 Claims, 10 Drawing Sheets

U.S. PATENT DOCUMENTS

| | | | |
|---|---|---|---|
| 2007/0220547 A1* | 9/2007 | Teskey | 725/39 |
| 2009/0061852 A1* | 3/2009 | Feher | 455/426.1 |
| 2009/0322583 A1* | 12/2009 | Reams et al. | 341/176 |
| 2010/0309389 A1* | 12/2010 | Hicks | 348/734 |
| 2011/0061078 A1* | 3/2011 | Rothschild | 725/51 |

FOREIGN PATENT DOCUMENTS

| | | |
|---|---|---|
| JP | 2001-242995 A | 9/2001 |
| JP | 2002-034023 A | 1/2002 |
| JP | 2004-328422 A | 11/2004 |
| JP | 2007-142690 A | 6/2007 |

* cited by examiner

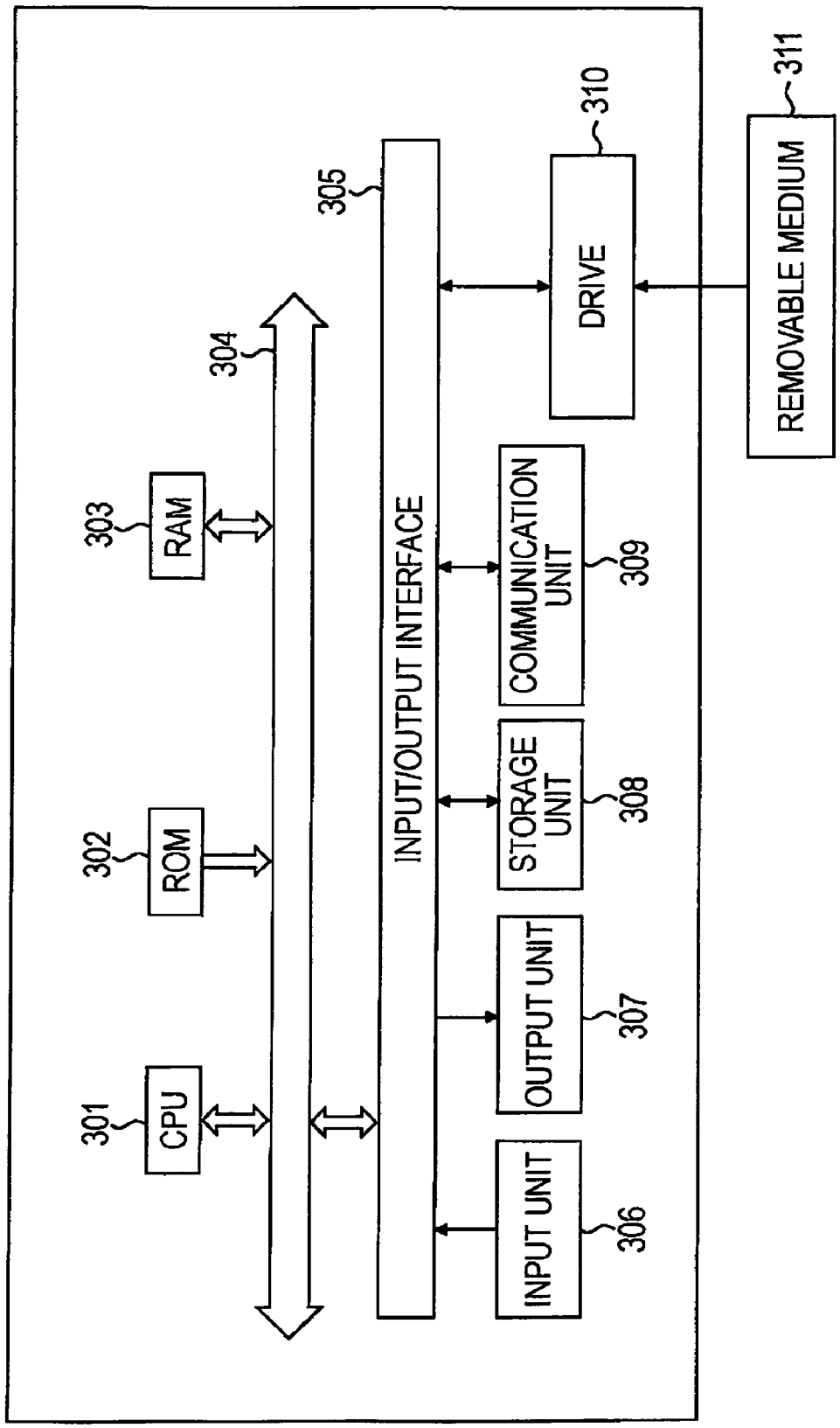

INFORMATION PROCESSING SYSTEM, INFORMATION PROCESSING DEVICE AND METHOD, REMOTE CONTROL, PROGRAM, AND RECORDING MEDIUM

CROSS REFERENCES TO RELATED APPLICATIONS

The present application claims priority from Japanese Patent Application JP No. 2007-229539 filed in the Japanese Patent Office on Sep. 4, 2007, the entire content of which is incorporated herein by reference.

BACKGROUND OF THE INVENTION

1. Field of the Invention

The present invention relates to information processing systems, information processing devices, information processing methods, remote controls, programs, and recording media, and more particularly, to an information processing system, an information processing device, an information processing method, a remote control, a program, and a recording medium that are suitably used for operating individual devices.

2. Description of the Related Art

Networks are widely used, and a wide range of services are available via the networks. Regarding the networks themselves, wired networks and wireless networks are available.

For example, a system called Location Frees using a network is available. For example, a system in which data is wirelessly transferred between a device (hereinafter, referred to as a transmitting device) to which a digital versatile disc (DVD) player or the like is connected and a device (hereinafter, referred to as a receiving device) to which a display device such as a television receiver is connected has been proposed (for example, see Japanese Unexamined Patent Application Publication No. 2002-34023).

In such a system, for example, in a case where a DVD player is connected to a transmitting device, a user is able to enjoy, on a display device located far from the DVD player, video images and sound of a DVD that is being played back by the DVD player.

In a case where a plurality of devices are connected to the transmitting device, a user who is located at a position far from the plurality of devices (that is, a position at which the user is not able to operate the plurality of devices by using remote controls dedicated to the plurality of devices) is able to operate a desired device among the plurality of devices connected to the transmitting device.

SUMMARY OF THE INVENTION

As described above, a user who is located far from a plurality of devices connected to a transmitting device is able to operate the plurality of devices. Normally, a dedicated remote control (hereinafter, referred to as a first remote control) is provided for each of the plurality of devices. The user is able to operate a desired device by using a corresponding first remote control.

In a case where a plurality of devices are connected to a transmitting device and one of the plurality of devices is operated via a receiving device, the user operates the one of the plurality of devices by using a remote control (hereinafter, referred to as a second remote control) for the receiving device, not by using a first remote control dedicated to the one of the plurality of devices.

Normally, a first remote control has a form different from that of a second remote control. Thus, in some cases, processing that can be caused to be performed by operating the first remote control is not achievable by operating the second remote control in a similar fashion. For example, processing that can be caused to be performed by operating a button located in an upper right portion of the first remote control may be achieved by operating a button located in a lower left portion of the second remote control. Since there is such a difference in position between the buttons, it is necessary for a user to find an appropriate button in order to perform a desired operation. Thus, looking for an appropriate button may bother the user.

In addition, a button (processing) included in the first remote control may not be included in the second remote control. In this case, the processing is not achievable by using the second remote control. In addition, in view of the fact that the plurality of devices connected to the transmitting device are operated using the second remote control, processing that is not achievable by using the second remote control may exist for each of the devices.

In order to solve the above-described problems, all the buttons to be used for the plurality of devices may be included in the second remote control. However, since in this case a large number of buttons would be included in the second remote control, the second remote control would be difficult to use. Thus, a remote control including an appropriate number of buttons, which does not reduce the usability of the remote control, and capable of causing the plurality of devices to perform all processing is desired.

It is desirable to provide a user-friendly remote control capable of causing a plurality of devices to perform all processing.

According to an embodiment of the present invention, there is provided an information processing system including a first device to which external devices are connected; a second device configured to transmit and receive data to and from the first device; and a remote control provided for the second device. The remote control includes a plurality of buttons to which codes are allocated, the codes being different for each of the external devices. The second device includes storing means for storing, for each of the external devices, a table representing a relationship between the codes and the plurality of buttons of the remote control, generating means for generating data of a graphical user interface in which a picture of the remote control and a field, where button names corresponding to the codes allocated to the plurality of buttons are indicated, are located in predetermined positions, and control means for performing, in the case that a button that is included in the remote control and that is to be operated so that a command to change the button names indicated in the field can be issued has been operated, control such that the codes allocated to the plurality of buttons are changed while the table stored by the storing means is referred to and that the button names indicated in the field are changed to button names corresponding to the changed codes.

In the information processing system, a command from a remote control including a plurality of buttons to which codes are allocated, the codes being different for each of the external devices, is received; a table representing a relationship between the codes and the plurality of buttons of the remote control is stored for each of the external devices; data of a graphical user interface in which a picture of the remote control and a field, where button names corresponding to the codes allocated to the plurality of buttons are indicated, are located in predetermined positions is generated; and in the case that a specific button of the remote control has been operated, control such that the codes allocated to the plurality of buttons are changed while the table stored by the storing means is referred to and that the button names indicated in the field are changed to button names corresponding to the changed codes is performed.

According to another embodiment of the present invention, there is provided an information processing device that transmits and receives data to and from a device to which external devices are connected and that processes a signal transmitted from a remote control including a plurality of buttons to which codes are allocated, the codes being different for each of the external devices including storing means for storing, for each of the external devices, a table representing a relationship between the codes and the plurality of buttons of the remote control; generating means for generating data of a graphical user interface in which a picture of the remote control and a field, where button names corresponding to the codes allocated to the plurality of buttons are indicated, are located in predetermined positions; and control means for performing, in the case that a button that is included in the remote control and that is to be operated so that a command to change the button names indicated in the field can be issued has been operated, control such that the codes allocated to the plurality of buttons are changed while the table stored by the storing means is referred to and that the button names indicated in the field are changed to button names corresponding to the changed codes.

The graphical user interface may further have a field where an indication regarding an association between first button names of the plurality of buttons of the remote control and second button names of a plurality of buttons of a remote control dedicated to one of the external devices is provided.

Upon reception of a signal indicating that one of the plurality of buttons has been operated, the information processing device may transmit, to the device to which a corresponding one of the external devices is connected, a code set at the present time for the operated button represented by the signal.

A user may set the codes to be allocated to the plurality of buttons of the remote control.

The codes to be allocated to the plurality of buttons of the remote control may include a code set in advance for each of the external devices and a code to be additionally set by a user.

According to another embodiment of the present invention, there is provided an information processing method for use in an information processing device that transmits and receives data to and from a device to which external devices are connected and that processes a signal transmitted from a remote control including a plurality of buttons to which codes are allocated, the codes being different for each of the external devices, including the steps of: generating data of a graphical user interface in which a picture of the remote control and a field, where button names corresponding to the codes allocated to the plurality of buttons are indicated, are located in predetermined positions; and performing, in the case that a button that is included in the remote control and that is to be operated so that a command to change the button names indicated in the field can be issued has been operated, control such that the codes allocated to the plurality of buttons are changed while a table representing, for each of the external devices, a relationship between the codes and the plurality of buttons of the remote control is referred to and that the button names indicated in the field are changed to button names corresponding to the changed codes.

According to an embodiment of the present invention, there is provided a program for causing a computer to control an information processing device that transmits and receives data to and from a device to which external devices are connected and that processes a signal transmitted from a remote control including a plurality of buttons to which codes are allocated, the codes being different for each of the external devices including the steps of: generating data of a graphical user interface in which a picture of the remote control and a field, where button names corresponding to the codes allocated to the plurality of buttons are indicated, are located in predetermined positions; and performing, in the case that a button that is included in the remote control and that is to be operated so that a command to change the button names indicated in the field can be issued has been operated, control such that the codes allocated to the plurality of buttons are changed while a table representing, for each of the external devices, a relationship between the codes and the plurality of buttons of the remote control is referred to and that the button names indicated in the field are changed to button names corresponding to the changed codes.

According to another embodiment of the present invention, there is provided a recording medium on which a program for causing a computer to control an information processing device that transmits and receives data to and from a device to which external devices are connected and that processes a signal transmitted from a remote control including a plurality of buttons to which codes are allocated, the codes being different for each of the external devices is recorded including the steps of generating data of a graphical user interface in which a picture of the remote control and a field, where button names corresponding to the codes allocated to the plurality of buttons are indicated, are located in predetermined positions; and performing, in the case that a button that is included in the remote control and that is to be operated so that a command to change the button names indicated in the field can be issued has been operated, control such that the codes allocated to the plurality of buttons are changed while a table representing, for each of the external devices, a relationship between the codes and the plurality of buttons of the remote control is referred to and that the button names indicated in the field are changed to button names corresponding to the changed codes.

In the information processing device, the information processing method, and the program, a table representing, for each of the external devices, a relationship between the codes and the plurality of buttons of the remote control is stored; data of a graphical user interface in which a picture of the remote control and a field, where button names corresponding to the codes allocated to the plurality of buttons are indicated, are located in predetermined positions is generated; and in the case that a specific button of the remote control has been operated, control such that the codes allocated to the plurality of buttons are changed and that the button names indicated in the field are changed to button names corresponding to the changed codes is performed.

According to another embodiment of the present invention, there is provided a remote control to be used in a system including a first device to which external devices are connected, a second device that transmits and receives data to and from the first device, and a display device connected to the second device including a plurality of buttons to which codes are allocated, the codes being different for each of the external devices; a change button to be operated so that the codes allocated to the plurality of buttons can be changed; and a display button to be operated so that button names corresponding to the codes allocated to the plurality of buttons can be displayed on the display device.

The remote control includes at least a plurality of buttons to which codes are allocated, the codes being different for each of the external devices; a change button to be operated so that the codes allocated to the plurality of buttons can be changed;

and a display button to be operated so that button names corresponding to the codes allocated to the plurality of buttons can be displayed on the display device.

According to an embodiment of the present invention, a user is able to operate a plurality of devices located far from the user.

BRIEF DESCRIPTION OF THE DRAWINGS

FIG. 10 is an illustration for explaining a recording medium.

DESCRIPTION OF THE PREFERRED EMBODIMENTS

Figure 1:
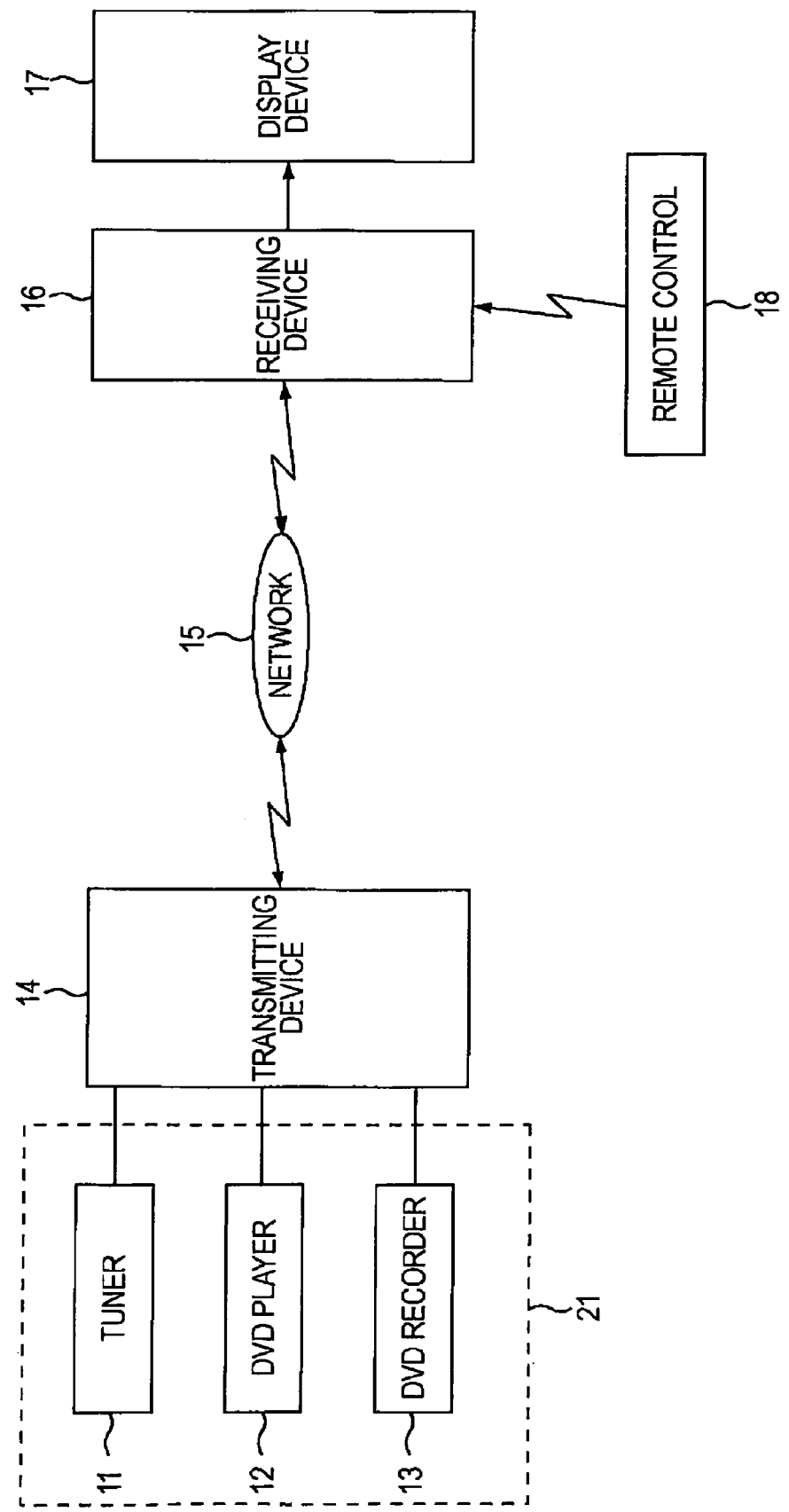
FIG. 1 shows an example of the configuration of an information processing system according to an embodiment of the present invention.

Before describing preferred embodiments of the present invention, the correspondence between the features of the present invention and embodiments described in the description of the preferred embodiments or the drawings will be discussed below. This description is intended to assure that embodiments supporting the invention are described in the description of the preferred embodiments or the drawings. Thus, even if an embodiment described in the description of the preferred embodiments or the drawings is not described here as relating to an embodiment corresponding to a feature of the present invention, this does not mean that the embodiment does not relate to that feature of the present invention. In contrast, even if an embodiment is described here as relating to a feature of the present invention, this does not mean that the embodiment does not relate to other features of the present invention.

According to an embodiment of the present invention, there is provided an information processing system including a first device (for example, a transmitting device 14 shown in FIG. 1) to which external devices (for example, external devices 21 shown in FIG. 1) are connected; a second device (for example, a receiving device 16 shown in FIG. 1) configured to transmit and receive data to and from the first device; and a remote control (for example, a remote control 18 shown in FIG. 1) provided for the second device. The remote control includes a plurality of buttons (for example, buttons 131-1 to 131-4 shown in FIG. 4) to which codes are allocated, the codes being different for each of the external devices. The second device includes storing means (for example, an EEPROM 91 shown in FIG. 3) for storing, for each of the external devices, a table representing a relationship between the codes and the plurality of buttons of the remote control; generating means (for example, an on-screen display processor 85 shown in FIG. 3) for generating data of a graphical user interface (for example, a graphical user interface shown in FIG. 6) in which a picture of the remote control and a field, where button names corresponding to the codes allocated to the plurality of buttons are indicated, are located in predetermined positions, and control means (for example, a remote-control reception signal processor 89, the on-screen display processor 85) for performing, in the case that a button that is included in the remote control and that is to be operated so that a command to change the button names indicated in the field can be issued has been operated, control such that the codes allocated to the plurality of buttons are changed while the table stored by the storing means is referred to and that the button names indicated in the field are changed to button names corresponding to the changed codes.

According to another embodiment of the present invention, there is provided an information processing device (for example, the receiving device 16 shown in FIG. 3) that transmits and receives data to and from a device to which external devices are connected and that processes a signal transmitted from a remote control including a plurality of buttons to which codes are allocated, the codes being different for each of the external devices including storing means (for example, the EEPROM 91 shown in FIG. 3) for storing, for each of the external devices, a table representing a relationship between the codes and the plurality of buttons of the remote control; generating means (for example, the on-screen display processor 85 shown in FIG. 3) for generating data of a graphical user interface (for example, the graphical user interface shown in FIG. 6) in which a picture of the remote control and a field, where button names corresponding to the codes allocated to the plurality of buttons are indicated, are located in predetermined positions; and control means (for example, the remote-control reception signal processor 89, the on-screen display processor 85) for performing, in the case that a button that is included in the remote control and that is to be operated so that a command to change the button names indicated in the field can be issued has been operated, control such that the codes allocated to the plurality of buttons are changed while the table stored by the storing means is referred to and that the button names indicated in the field are changed to button names corresponding to the changed codes.

According to another embodiment of the present invention, there is provided a remote control (for example, the remote control 18 shown in FIG. 4) including a plurality of buttons (for example, the buttons 131-1 to 131-4 shown in FIG. 4) to which codes are allocated, the codes being different for each of external devices; a change button (for example, a button 122 shown in FIG. 4) to be operated so that the codes allocated to the plurality of buttons can be changed; and a display button (for example, a button 121 shown in FIG. 4) to be operated so that button names corresponding to the codes allocated to the plurality of buttons can be displayed on a display device.

Embodiments of the present invention will be described with reference to the drawings.

FIG. 1 shows an example of the configuration of an information processing system according to an embodiment of the present invention. Referring to FIG. 1, the information processing system includes a tuner 11, a digital versatile disc (DVD) player 12, a DVD recorder 13, a transmitting device 14, a network 15, a receiving device 16, a display device 17, and a remote control 18.

The tuner 11, the DVD player 12, and the DVD recorder 13 are connected to the transmitting device 14. In this example, the three devices, that is, the tuner 11, the DVD player 12, and the DVD recorder 13, are connected to the transmitting device 14. However, the number of devices to be connected to the transmitting device 14 is not necessarily three. In addition, the types of devices to be connected to the transmitting device 14 are not necessarily limited to the types of devices shown in FIG. 1. As described above, a plurality of external devices 21 (in this example, the tuner 11, the DVD player 12, and the DVD recorder 13) are connected to the transmitting device 14.

The network 15 includes, for example, the Internet and a local-area network (LAN). The network 15 may be a wired network or a wireless network. Alternatively, the network 15 may include wired and wireless networks. Data is transferred between the transmitting device 14 and the receiving device 16 via the network 15. In the description below, for the sake of explanation, the transmitting device 14 and the receiving device 16 are referred to by the terms "transmitting device", and "receiving device", respectively. However, the transmitting device 14 is also configured to receive data from the receiving device 16 and process the data, and the receiving device 16 is also configured to transmit data to the transmitting device 14.

Data of a program being broadcasted on a television broadcasting channel selected by the tuner 11, video data of a DVD being played back by the DVD player 12, video data recorded in the DVD recorder 13 and being played back, and the like are transmitted from the transmitting device 14 to the receiving device 16. On the basis of code received from the receiving device 16, the transmitting device 14 transmits a signal to a device connected to the transmitting device 14.

The receiving device 16 supplies the received data to the display device 17. The display device 17 is, for example, a television receiver. The display device 17 processes video data received from the receiving device 16, and provides video images to a user.

The remote control 18 issues a command to the receiving device 16. Normally, the tuner 11, the DVD player 12, and the DVD recorder 13, which are connected to the transmitting device 14, have remote controls to be used for operating the tuner 11, the DVD player 12, and the DVD recorder 13, respectively. The remote control 18 is different from each of the remote controls dedicated to the tuner 11, the DVD player 12, and the DVD recorder 13. By issuing commands to the receiving device 16 by using the remote control 18, the user is able to operate a plurality of devices (in this example, the tuner 11, the DVD player 12, and the DVD recorder 13).

The remote control 18 is configured to be capable of issuing commands to a plurality of devices. The commands issued by the remote control 18 are received by the receiving device 16 and are converted by the receiving device 16 into codes appropriate for the individual devices. Then, the receiving device 16 transmits the obtained codes to the transmitting device 14.

In the above-described system, for example, the transmitting device 14 and the receiving device 16 are installed in different rooms. Thus, in this case, for example, the DVD player 12, which is connected to the transmitting device 14, and the display device 17, which is connected to the receiving device 16, are installed in different rooms. In the above-described system, the user is able to enjoy, on the display device 17 located in front of the user, video images and sound received from the DVD player 12, while operating, by using the remote control 18, the DVD player 12, which is installed in a room that is different from a room where the user is located.

Figure 2:
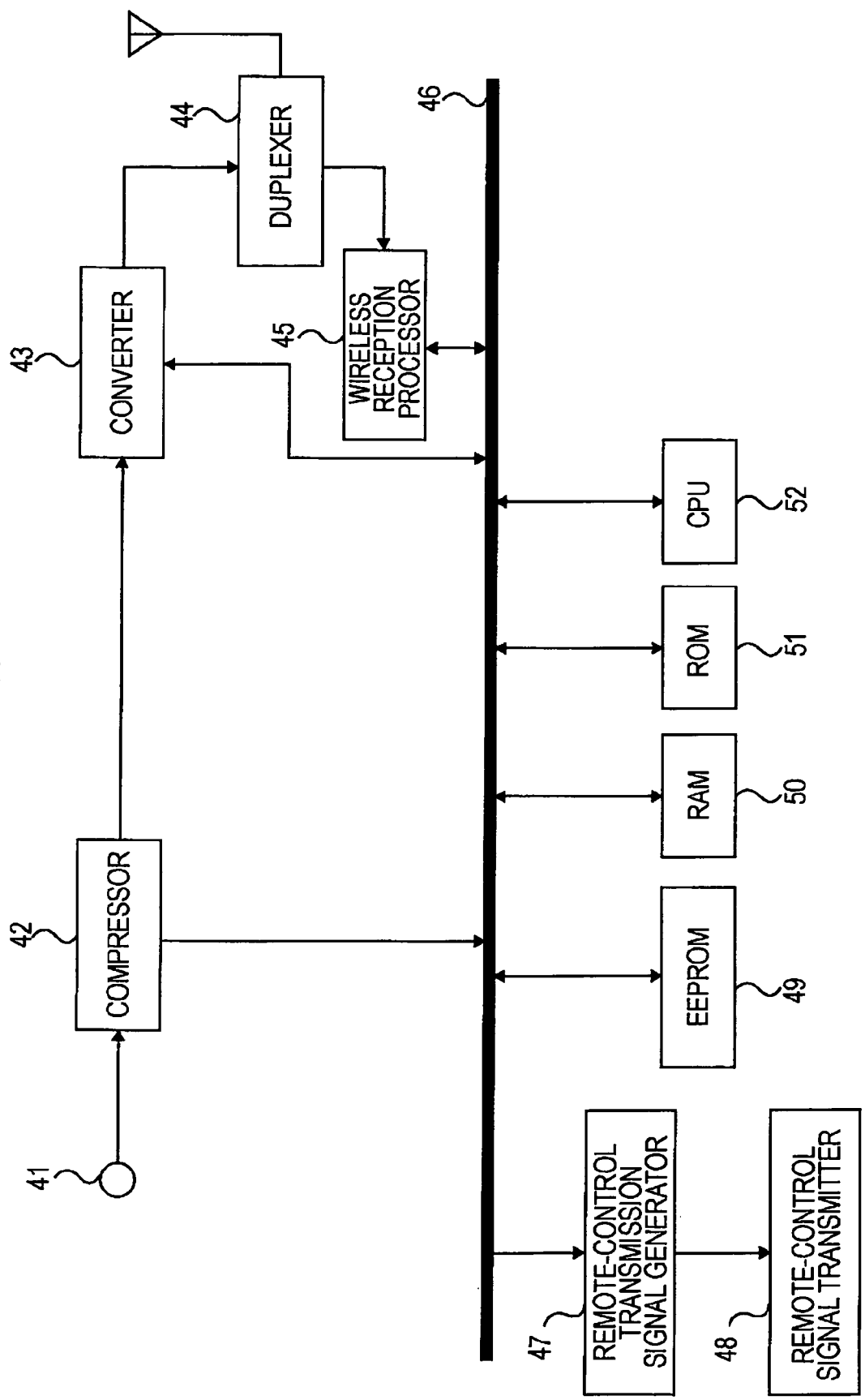
FIG. 2 shows an example of the configuration of a transmitting device.

Devices constituting the above-described system will be described in more detail. FIG. 2 shows an example of the internal configuration of the transmitting device 14. The transmitting device 14 includes an input terminal 41, a compressor 42, a converter 43, a duplexer 44, a wireless reception processor 45, a bus 46, a remote-control transmission signal generator 47, a remote-control signal transmitter 48, an electrically erasable programmable read-only memory (EEPROM) 49, a random-access memory (RAM) 50, a read-only memory (ROM) 51, and a central processing unit (CPU) 52.

The compressor 42, the converter 43, the wireless reception processor 45, the remote-control transmission signal generator 47, the EEPROM 49, the RAM 50, the ROM 51, and the CPU 52 are connected to the bus 46.

The external device 21 is connected to the input terminal 41. Although only one input terminal 41 is shown in FIG. 2, the number of input terminals 41 corresponds to the number of external devices 21 that can be connected to the transmitting device 14. Data transmitted from the external device 21 connected to the input terminal 41 is supplied to the compressor 42. The compressor 42 compresses the received data in accordance with a specific compression method. For example, in the case that the data received from the external device 21 is video data, the received data is compressed based on a moving picture experts group (MPEG) method.

The data compressed by the compressor 42 is supplied to the converter 43. The converter 43 converts the received data into data appropriate for a communication method adopted for communication with the receiving device 16. The obtained data is transmitted, via an antenna through the duplexer 44, to the receiving device 16. Data (including code) transmitted from the receiving device 16 is supplied, via the duplexer 44, to the wireless reception processor 45.

Data (code) processed by the wireless reception processor 45 is supplied to the remote-control transmission signal generator 47. The remote-control transmission signal generator 47 generates a signal for transmitting code to the external device 21, and supplies the generated signal to the remote-control signal transmitter 48. For example, the remote-control signal transmitter 48 is configured to transmit code via infrared rays. The remote-control signal transmitter 48 transmits the received signal to the external device 21.

Programs necessary for the CPU 52 to perform processing, data necessary for the CPU 52 or each of the units constituting the transmitting device 14 to perform processing, and the like are stored in the EEPROM 49, the RAM 50, and the ROM 51 in an appropriate manner.

The configuration of the receiving device 16, which transmits and receives data to and from the transmitting device 14, will be described with reference to FIG. 3.

Figure 3:
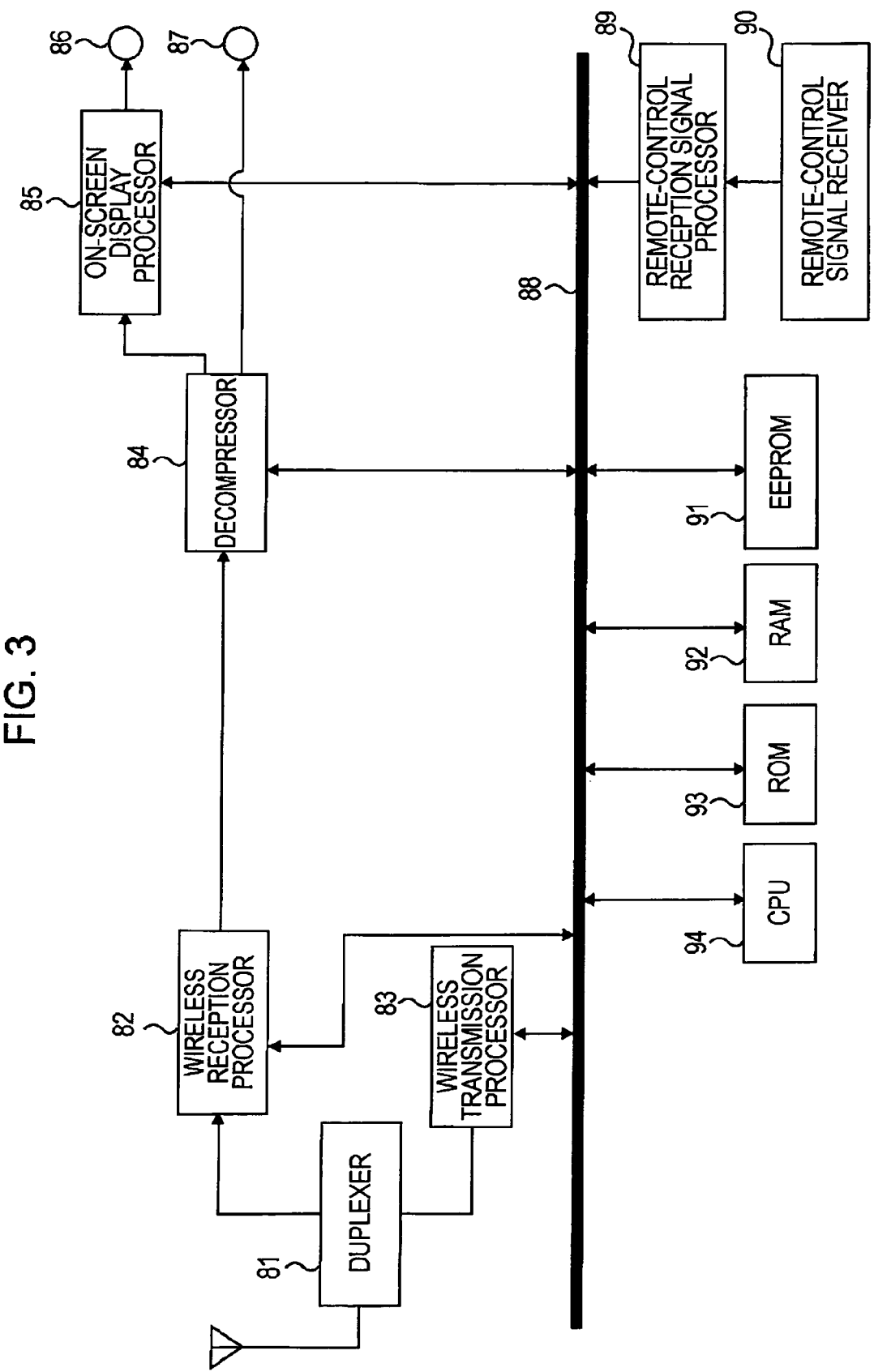
FIG. 3 shows an example of the configuration of a receiving device.

Referring to FIG. 3, the receiving device 16 includes a duplexer 81, a wireless reception processor 82, a wireless transmission processor 83, a decompressor 84, an on-screen display processor 85, a video output terminal 86, a sound output terminal 87, a bus 88, a remote-control reception signal processor 89, a remote-control signal receiver 90, an EEPROM 91, a RAM 92, a ROM 93, and a CPU 94.

The wireless reception processor 82, the wireless transmission processor 83, the decompressor 84, the on-screen display processor 85, the video output terminal 86, the sound output terminal 87, the remote-control reception signal processor 89, the EEPROM 91, the RAM 92, the ROM 93, and the CPU 94 are connected to the bus 88.

Data received from the transmitting device 14 via the duplexer 81 is supplied to the wireless reception processor 82. Video data and sound data compressed by the transmitting device 14 are supplied to the wireless reception processor 82. The wireless reception processor 82 supplies the received video data and sound data to the decompressor 84. The decompressor 84 decompresses the received data to obtain uncompressed data.

The decompressor 84 supplies decompressed video data to the on-screen display processor 85 and supplies decompressed sound data to the sound output terminal 87. For example, when a command to display information regarding the remote control 18 has been issued, the on-screen display processor 85 generates data of a screen (hereinafter, referred to as a graphical user interface (GUI)) indicating information regarding the remote control 18 and supplies the generated GUI to the video output terminal 86. When it is unnecessary to generate data of a GUI, the on-screen display processor 85 directly supplies, to the video output terminal 86, the data received from the decompressor 84.

The video output terminal 86 is connected to the display device 17 (see FIG. 1). The display device 17 processes video data supplied via the video output terminal 86, and provides the user with video images. The sound output terminal 87 is connected to, for example, a speaker (not shown). The speaker processes sound data supplied via the sound output terminal 87, and provides the user with sound.

The remote-control reception signal processor 89 processes a signal transmitted from the remote control 18 and received at the remote-control signal receiver 90. The signal transmitted from the remote control 18 indicates which button among a plurality of buttons included in the remote control 18 has been operated. The remote-control reception signal processor 89 analyzes the received signal and converts the signal into code appropriate for the external device 21. The code obtained by the conversion performed by the remote-control reception signal processor 89 is supplied to the wireless transmission processor 83. The wireless transmission processor 83 transmits the code via the duplexer 81 to the transmitting device 14.

Programs necessary for the CPU 94 to perform processing, data necessary for each of the units constituting the receiving device 16 to perform processing, and the like are stored in the EEPROM 91, the RAM 92, and the ROM 93 in an appropriate manner.

The remote control 18, which issues commands to the receiving device 16, will be described with reference to FIG. 4.

Figure 4:
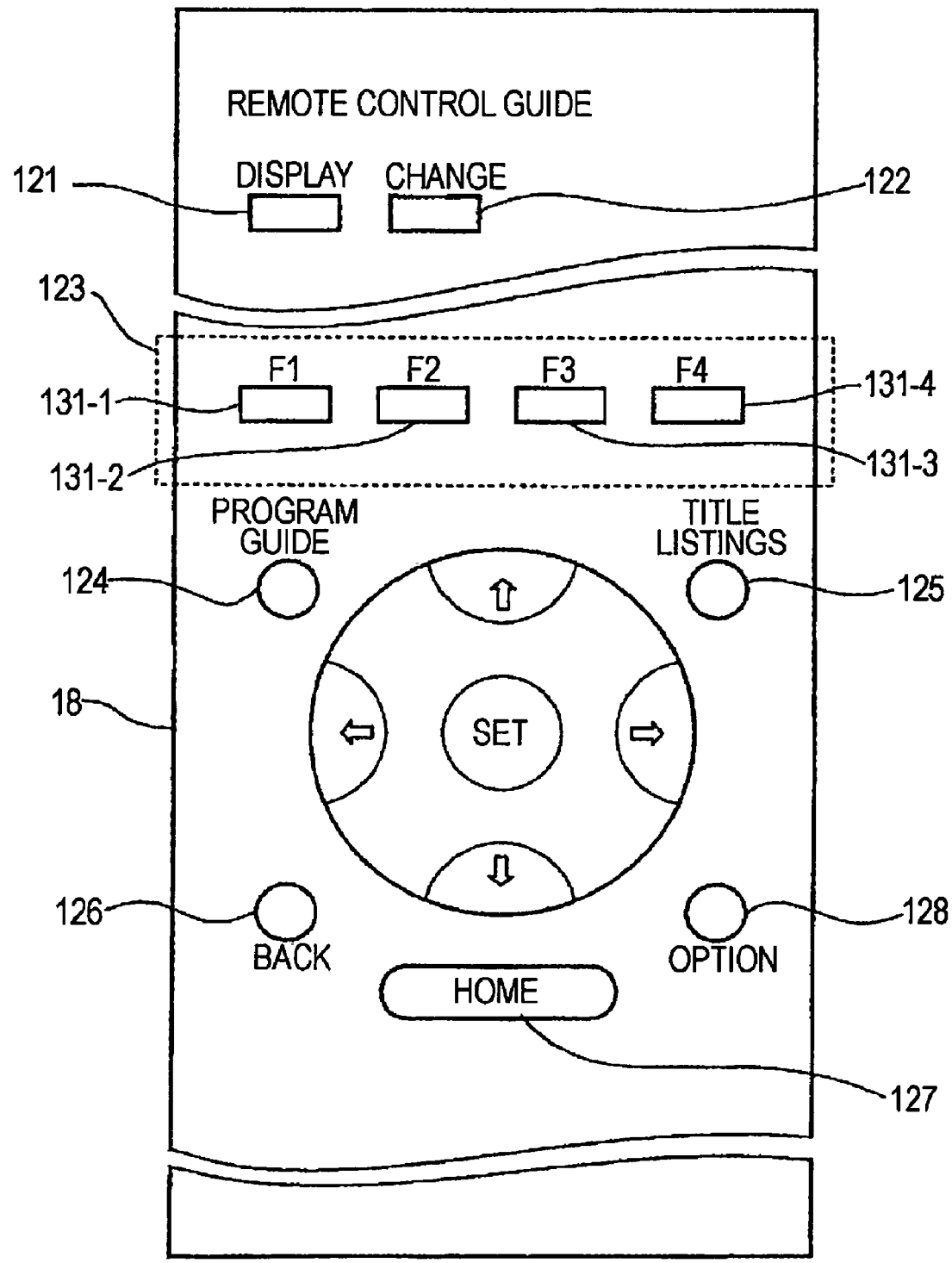
FIG. 4 shows an example of the external configuration of a remote control.

FIG. 4 shows an example of the external configuration of the remote control 18. Only part of the remote control 18 is illustrated in FIG. 4. A "display" button 121 and a "change" button 122, which are buttons to be used for causing a feature of "remote control guide" to be performed, are provided in an upper portion of the remote control 18.

Figure 6:
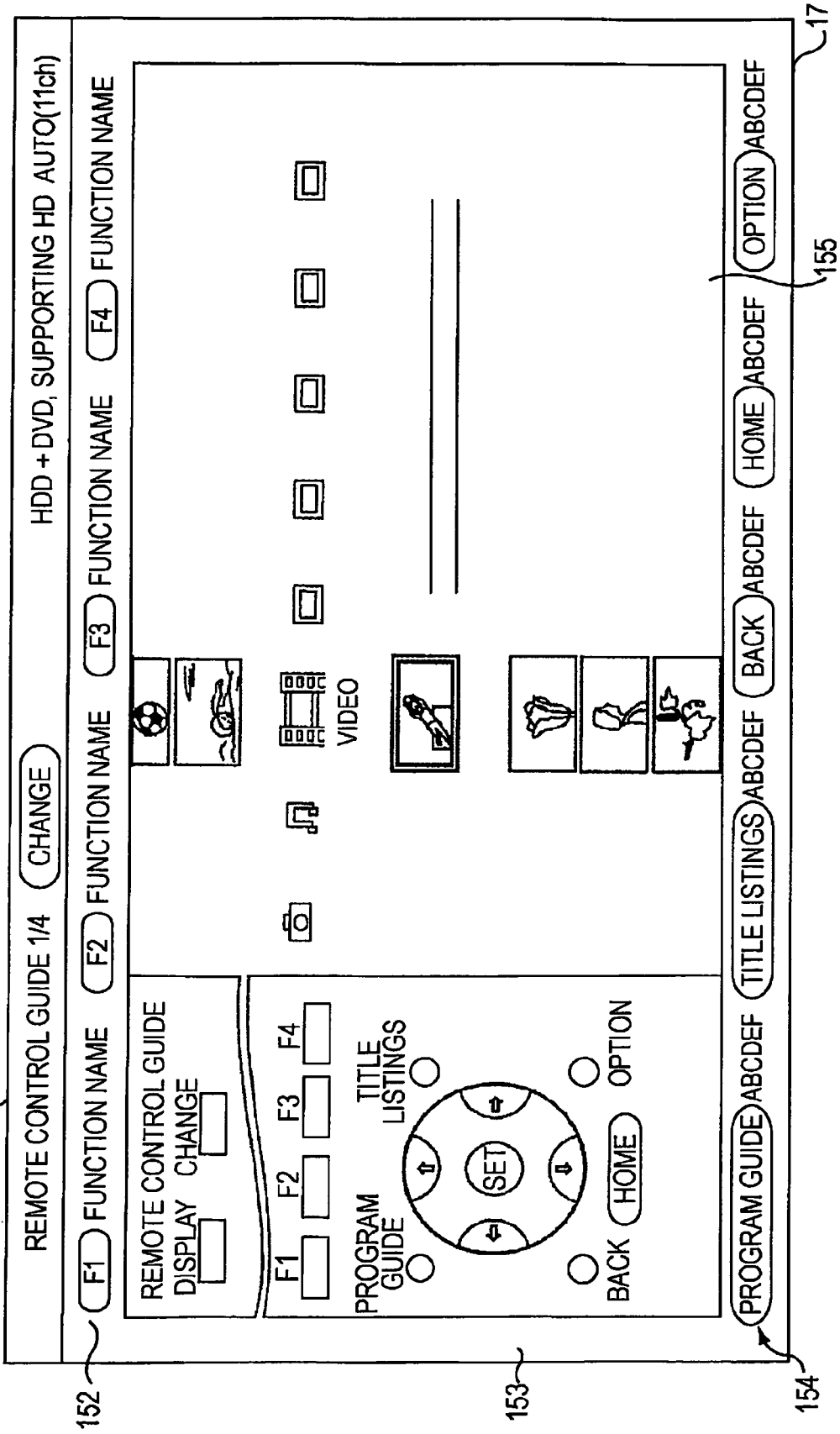
FIG. 6 shows an example of a graphical user interface.

The "display" button 121 is operated so that, for example, a screen (GUI) shown in FIG. 6 can be displayed on the display device 17. The "change" button 122 is operated so that codes allocated to buttons 131-1 to 131-4 provided in a field 123 can be changed. As described later, when the "change" button 122 is operated, display (or part of display) on the GUI shown in FIG. 6 is changed.

The remote control 18 has the field 123. The buttons 131-1, 131-2, 131-3, and 131-4 having names "F1", "F2", "F3", and "F4", respectively, are provided in the field 123. Functions are allocated to the individual buttons 131-1 to 131-4 and the functions are different for each of the external devices 21.

Referring back to FIG. 1, in the example shown in FIG. 1, the three external devices 21, that is, the tuner 11, the DVD player 12, and the DVD recorder 13, are connected to the transmitting device 14. The remote control 18 is configured to be capable of operating the external devices 21 connected to the transmitting device 14. In addition, although not illustrated in FIG. 1, for example, a remote control dedicated to the DVD player 12 exists.

Since both the remote control 18 and the remote control dedicated to the DVD player 12 are configured to be capable of operating the DVD player 12, it is desirable that all the commands that can be issued using the remote control dedicated to the DVD player 12 be issued using the remote control 18. Normally, however, the remote control 18 and the dedicated remote control have different forms.

Since there are differences in forms and positions of buttons between the remote control 18 and the dedicated remote control, an operation that can be caused to be performed by using the dedicated remote control may not be achieved by using the remote control 18. For example, the user wants to operate the remote control 18 in order to perform processing that can be caused to be performed when a button located in an upper right portion of the dedicated remote control is operated. In this case, however, since the remote control 18 does not have a button to be used for causing the processing to be performed, the processing is not achievable by using the remote control 18.

The above-described problem does not necessarily occur only in the case of the remote control dedicated to the DVD player 12. The above-described problem may occur in each of the external devices 21. In order to solve the above-described problem, all the buttons included in each of the plurality of external devices 21 may be included in the remote control 18. However, in this case, a large number of buttons are included in the remote control 18. Thus, it takes a long time to find a desired button, thereby reducing the usability of the remote control 18.

Thus, in this embodiment, the buttons 131-1 to 131-4 are provided in the field 123. The buttons 131-1 to 131-4 are provided in order to cause functions that can be achieved by using the remote control dedicated to the external device 21 and that are different from functions allocated to buttons of the remote control 18 other than the buttons 131-1 to 131-4 to be performed. Alternatively, the buttons 131-1 to 131-4 are provided as buttons to which functions that are already allocated to buttons other than the buttons 131-1 to 131-4 and that are desired by the user can be allocated.

Buttons of the remote control 18 that are other than the buttons 131-1 to 131-4 and that are not illustrated in FIG. 4 are, for example, a button to be used for changing a channel of a television broadcasting program to be received by the tuner 11, buttons provided with numbers to be used for scheduling a recording on the DVD recorder 13, and buttons to be used for instructing the DVD player 12 or the DVD recorder 13 to perform playback, stop, fast-forward, and rewind. These buttons are common to the plurality of external devices 21 and are frequently used.

In contrast to the above-described buttons, the buttons 131-1 to 131-4 are, for example, buttons that are included in the remote control dedicated to the DVD player 12, that are unique to the DVD player 12, and that are not included in a remote control dedicated to the DVD recorder 13 and buttons that are not frequently used. Alternatively, the buttons 131-1 to 131-4 may be buttons to be used for causing desired functions allocated by the user to be performed and may have functions similar to those allocated to other buttons located in other portions.

A case where the buttons 131-1 to 131-4 are buttons that are unique to a certain external device 21 and that are not frequently used will be described by way of example. Codes allocated to the buttons 131-1 to 131-4 in a case where a device to be operated is the DVD player 12 are different from codes allocated to the buttons 131-1 to 131-4 in a case where a device to be operated is the DVD recorder 13 (the same codes may be allocated; however, basically, different codes are allocated).

With the provision of the buttons 131-1 to 131-4, the remote control 18 including buttons adequate for operating the plurality of external devices 21 can be provided.

Referring back to FIG. 4, which shows the configuration of the remote control 18, a button 124 having the name "program guide", a button 125 having the name "title listings", a button 126 having the name "back", a button 127 having the name "home", and a button 128 having the name "option" are included in the remote control 18.

For example, the user operates the button 124 having the name "program guide", when the user wants to browse a program guide of television broadcasts. The button 124 does not necessarily have the name "program guide". A different name may be allocated to the button 124 depending on the manufacturer of the external device 21. In other words, a button to be operated by the user in order to browse a program guide does not necessarily have the name "program guide". For example, the name "program listings" may be allocated to the button.

Even in a case where the same functions as the functions allocated to buttons of the remote control dedicated to the external device 21 are allocated to the buttons 124 to 128, names that are different from the names of the buttons of the remote control dedicated to the external device 21 may be allocated to the buttons 124 to 128. As described later, in order that differences in terms of button names do not confuse the user, the names of the buttons of the remote control dedicated to the external device 21 that correspond to the buttons 124 to 128 are indicated on the GUI.

A process to be performed by the system shown in FIG. 1 in a case where the user operates the external device 21 by using the remote control 18 will be described with reference to a flowchart shown in FIG. 5. A process regarding the buttons 131-1 to 131-4 provided in the field 123 will be mainly described with reference to the flowchart shown in FIG. 5.

In step S11, the user selects a desired external device 21 that the user wants to operate using the remote control 18. The receiving device 16 receives information on the selected external device 21.

In step S12, the receiving device 16 determines code corresponding to the external device 21, information of which has been acquired in step S11. For example, tables for individual external devices 21 are stored in advance in the EEPROM 91 of the receiving device 16. Codes allocated to buttons of the remote control 18 are stored, in association with the buttons, in each of the tables. The codes are also associated with button names.

In step S13, on the basis of the determined code, button names to be indicated on the GUI at default are determined. The on-screen display processor 85 reads, from the table, the button names based on the code determined in step S12, and generates data of the GUI. The GUI will be described in more detail with reference to FIG. 6. The GUI shown in FIG. 6 is displayed on the display device 17 when the user operates the "display" button 121 on the remote control 18 (see FIG. 4).

FIG. 6 shows an example of a GUI to be displayed on the display device 17 on the basis of data of a GUI generated by the receiving device 16. A field 151 in which a value regarding the number of pages is indicated is provided in an upper portion of the GUI shown in FIG. 6. The number of pages indicated in the field 151 represents the number of times the button names indicated in a field 152 are changed when the "change" button 122 of the remote control 18 is operated.

For example, the value "1/4" is indicated in the field 151 shown in FIG. 6. This indicates that the number of pages is four and the first page of four pages is being displayed. The value regarding the number of pages is changed in the order of "2/4", "3/4", and "4/4" every time the "change" button 122 is operated. When the "change" button 122 is operated in a state where the value "4/4" is being indicated, the value "1/4" is indicated again.

The number of pages indicated in the field 151, that is, the value "4" in a case where the value regarding the number of pages "1/4", is indicated, is set for each of the external devices 21. The number of pages is not necessarily "4". Namely, since the number of functions allocated to the buttons 131-1 to 131-4 is different for each of the external devices 21, the number of pages indicated in the field 151 is different for each of the external devices 21.

Button names allocated to the individual buttons 131-1 to 131-4 provided in the field 123 of the remote control 18 are indicated in the field 152. For example, a name button indicating what type of processing is performed when the user operates the button 131-1 is indicated. Since a different function is allocated to the button 131-1 every time the user operates the "change" button 122, a button name indicated in the field 152 is also changed every time the user operates the "change" button 122. A state in which a button name indicated in the field 152 is changed will be referred to as "changing of a page".

By referring to a button name indicated in the field 152, the user is able to identify what type of function can be performed, for example, when the user operates the button 131-1 in the present state. Although the user is able to operate the plurality of external devices 21 by using the remote control 18, functions allocated to the button 131-1 may be different for each of the external devices 21. Even in a case where different functions are allocated to a button, by browsing a button name being indicated, the user is able to accurately find, without confusion, and operate a button that the user should operate in order to cause a desired function to be performed.

A field 153 in which the picture of the external appearance of the remote control 18 is displayed is provided in a left portion of the GUI shown in FIG. 6. The picture indicated in the field 153 shows a remote control including buttons whose positions and forms are the same as the positions and forms of the buttons of the remote control 18. The whole external appearance of the remote control 18 may be indicated in the field 153. However, only part of the external appearance of the remote control 18 may be indicated, as shown in FIG. 6.

A field 154 in which button names of the buttons 124 to 128 of the remote control 18 are indicated is provided in a lower portion of the GUI shown in FIG. 6. Although, for example, the names "program guide", "title listings", "back", "home", and "option" are allocated to the buttons 124 to 128 as described above, different button names may be provided, mainly depending on the manufacturer. In a case where different button names are allocated to a button to be used for causing the same function to be performed, such a difference in name between buttons may confuse the user.

In order to solve the above-described problem, button names provided for the external device 21 being operated at the present time can be indicated in the field 154. Namely, button names provided for the remote control dedicated to the external device 21 and button names of the buttons 124 to 128 of the remote control 18 are indicated in association with each other in the field 154. Button names indicated in the field 154 are set for each of the external devices 21. Thus, even when the user operates the "change" button 122, the button names indicated in the field 154 are not changed.

A field 155 is provided in a center portion of the GUI shown in FIG. 6. For example, video images, such as a list of programs, supplied from the external device 21 being operated at that time are indicated in the field 155.

Figure 5:
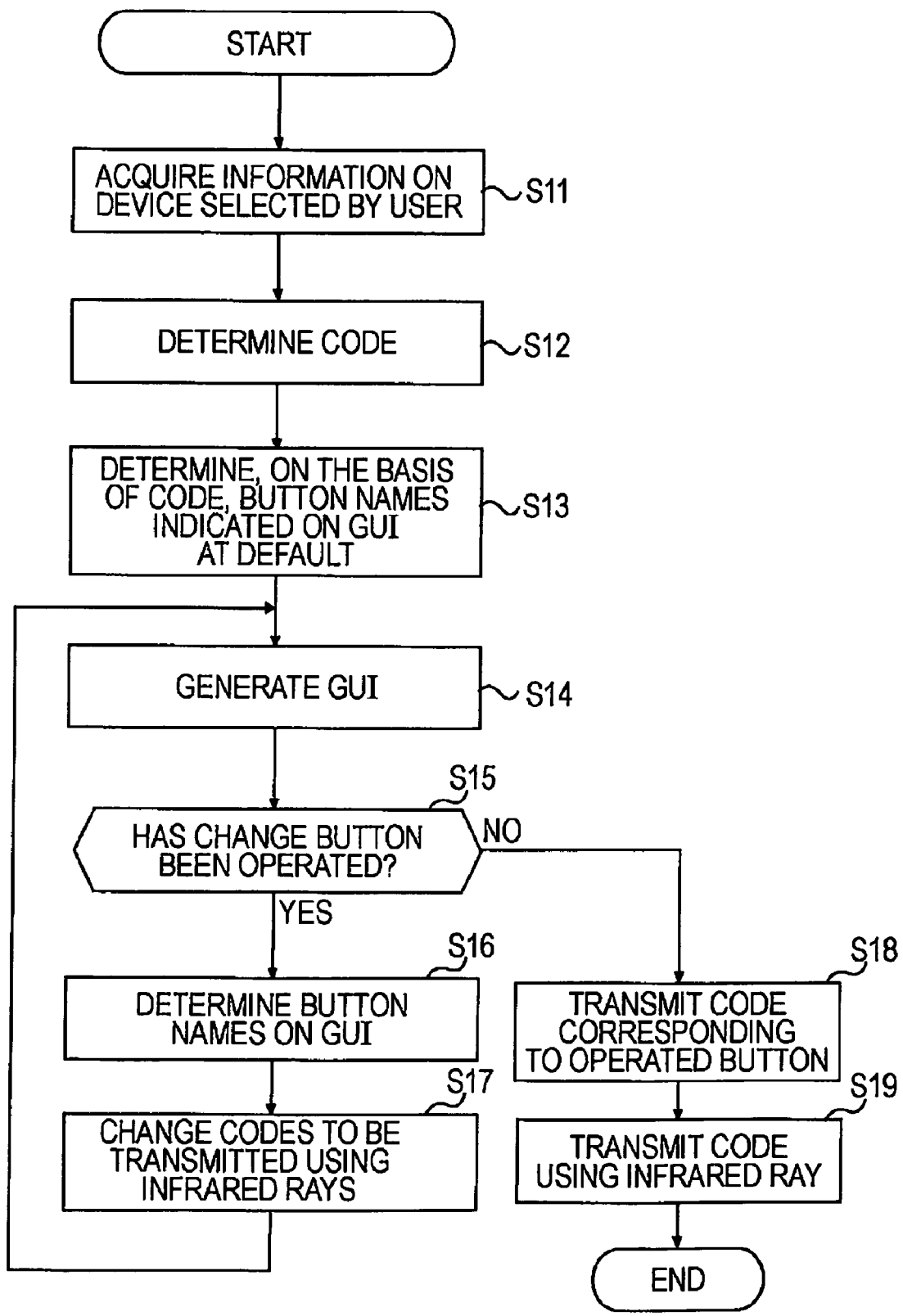
FIG. 5 is a flowchart showing a process to be performed by the system.

Referring back to the flowchart shown in FIG. 5, in step S13, button names to be indicated on the GUI at default are determined on the basis of the determined code. The button names determined in step S13 are button names to be indicated in the field 152 and button names to be indicated in the field 154. The GUI at default is the GUI that is displayed, for example, in the case where the first page is being displayed, that is, the value regarding the number of pages, for example, "1/4" is being indicated in the field 151, as shown in FIG. 6.

In step S14, data of the GUI is generated. That is, in this case, image data of the GUI in which button names determined in step S13 are indicated in corresponding positions in the fields 152 and 154 is generated.

In step S15, it is determined whether the "change" button 122 has been operated. When the remote-control signal receiver 90 receives a signal, the remote-control reception signal processor 89 determines, by analyzing the received signal, whether which button of the remote control 18 has been operated. On the basis of a result of the determination, it is determined whether the "change" button 122 has been operated. If it is determined in step S15 that the "change" button 122 has been operated, the process proceeds to step S16.

In step S16, button names on the GUI are set. That is, as processing to be performed in response to the operation of the "change" button 122, the table stored in the EEPROM 91 is referred to and the button names to be indicated in the field 152 in the next page are determined. In accordance with the processing of step S16, codes to be transmitted using infrared rays are changed in step S17. That is, functions allocated to the buttons 131-1 to 131-4 are changed.

Since functions allocated to the buttons 131-1 to 131-4 of the remote control 18 are changed by operation of the "change" button 122, the codes are changed so as to correspond to the functions allocated to the changed buttons 131-1 to 131-4 in step S17.

After the button names to be indicated in the field 152 on the GUI are determined and codes to be used for commanding the external device 21 to perform the functions corresponding to the button names are changed in the processing of steps S16 and S17, the process returns to step S14 and the subsequent processing is repeated.

When the process returns to step S14, a GUI in which the button names determined in step S16 are indicated in the field 152 is generated. In the GUI, the value regarding the number of pages indicated in the field 151 is changed so that the value regarding the next page is indicated. Since the external device 21 is not changed, no change occurs in an indication in the field 154 and the button names indicated in the field 154 before the "change" button 122 is operated are the same as the button names indicated in the field 154 after the "change" button 122 is operated.

By confirming that the value regarding the number of pages indicated in the field 151 has been changed and confirming that button names indicated in the field 152 have been changed, the user is able to identify that functions allocated to the buttons 131-1 to 131-4 of the remote control 18 have been changed. Thus, the user is able to find a desired function by referring to button names indicated in the field 152 and operating the "change" button 122.

The form of the picture of the external appearance of the remote control indicated in the field 153 on the GUI shown in FIG. 6 is the same as the form of the remote control 18 that the user actually operates. In addition, in the picture of the external appearance of the remote control indicated in the field 153, the buttons 131-1 to 131-4 and the like are displayed in color so that the user is able to easily identify the buttons. Since the form of the remote control and the positions of the buttons of the remote control indicated in the field 153 are the same as the form of the remote control 18 and the positions of the buttons of the remote control 18, by referring to the button names indicated in the field 152 and the field 154 on the GUI, the user is able to accurately identify what functions are allocated to individual buttons. Thus, the user can be prevented from operating an inappropriate button.

Referring back to the flowchart shown in FIG. 5, if it is determined in step S15 that the "change" button 122 has not been operated, the process proceeds to step S18. For example, when the button 131-1 is operated, the process proceeds to step S18. In step S18, a code corresponding to the operated button is transmitted.

For example, when the button 131-1 of the remote control 18 is operated, a signal indicating that the button 131-1 has been operated is output to the receiving device 16. The remote-control signal receiver 90 of the receiving device 16 receives the signal transmitted from the remote control 18. Then, the remote-control reception signal processor 89 refers to the table stored in the EEPROM 91 to determine a code allocated to the button 131-1. The code indicates the details of a command represented by a signal to be transmitted from the transmitting device 14 to the external device 21 via infrared communication.

In step S19, the transmitting device 14 outputs, to the external device 21, an infrared ray corresponding to the received code.

By performing the above-described processing, the user is able to operate, by operating the remote control 18, the external device 21, which is located far from the user. In addition, in the case of operating the remote control 18, the user is able to accurately operate a button that is to be operated so that a desired function can be performed.

In the above-described embodiment, an example in which the external device 21 allocates in advance functions to the buttons 131-1 to 131-4 provided in the field 123 has been described. A feature in which functions allocated to the buttons 131-1 to 131-4 can be changed by the user may be provided. A case where the user is able to allocate desired functions to the buttons 131-1 to 131-4 and a case where the user is able to allocate additional functions, that is, functions other than already allocated functions, to the buttons 131-1 to 131-4 will be described. With the provision of a learning feature, the usability of the buttons 131-1 to 131-4 can be further improved.

Figure 7:
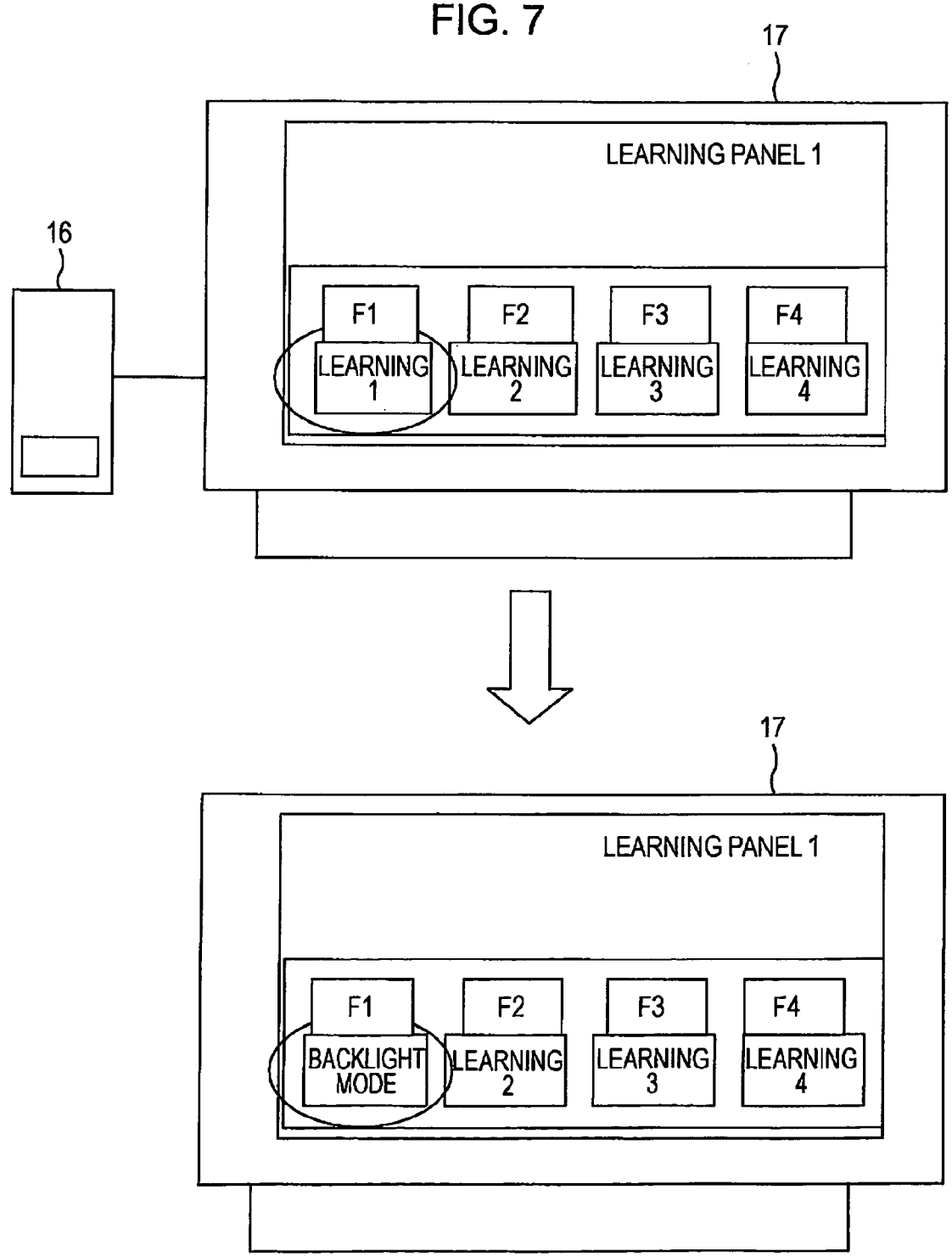
FIG. 7 is an illustration for explaining learning processing.

Learning processing in the case where the user allocates desired functions to the buttons 131-1 to 131-4 will be described with reference to FIG. 7. In order to utilize a learning feature, the user performs a predetermined operation to cause the remote control 18 to enter a learning mode. When the learning mode is set, a learning screen is displayed on the display device 17, as shown in FIG. 7. In the example shown in FIG. 7, the indication "learning panel 1" and the button names "F1", "F2", "F3", and "F4" to be programmed are displayed. In this case, the buttons 131-1 to 131-4 correspond to the button names "F1", "F2", "F3", and "F4".

The user selects a button of the remote control 18 to be programmed, and operates the button while pointing the remote control 18 at the receiving device 16. The receiving device 16 receives a signal identifying the button of the remote control 18 that has been operated by the user. When the signal is received, for example, processing for changing the color of a button name on the learning screen corresponding to the operated button is performed.

A state where the button 131-1 corresponding to "F1" has been operated is shown in an upper drawing of FIG. 7. A state where the user has performed an operation for allocating a "backlight mode" function to the button 131-1 corresponding to "F1" is shown in a lower drawing of FIG. 7. As described above, the user is able to edit the button name of a desired button.

In addition, the user is able to repeat the above-described processing. That is, as described above, for example, a plurality of functions can be allocated to the button 131-1 of the remote control 18. Every time the "change" button 122 is operated, the function allocated to the button 131-1 can be changed. Thus, with the use of a learning feature, a plurality of functions can be applied to a button.

The user is able to allocate a desired function to a desired button on a desired page. That is, as described above, when the user operates the change button 122, button names indicated in the field 152 on the GUI are changed. In a case where such a change is represented by "changing of a page", the user is able to allocate a desired function to a desired button on each page.

Figure 8:
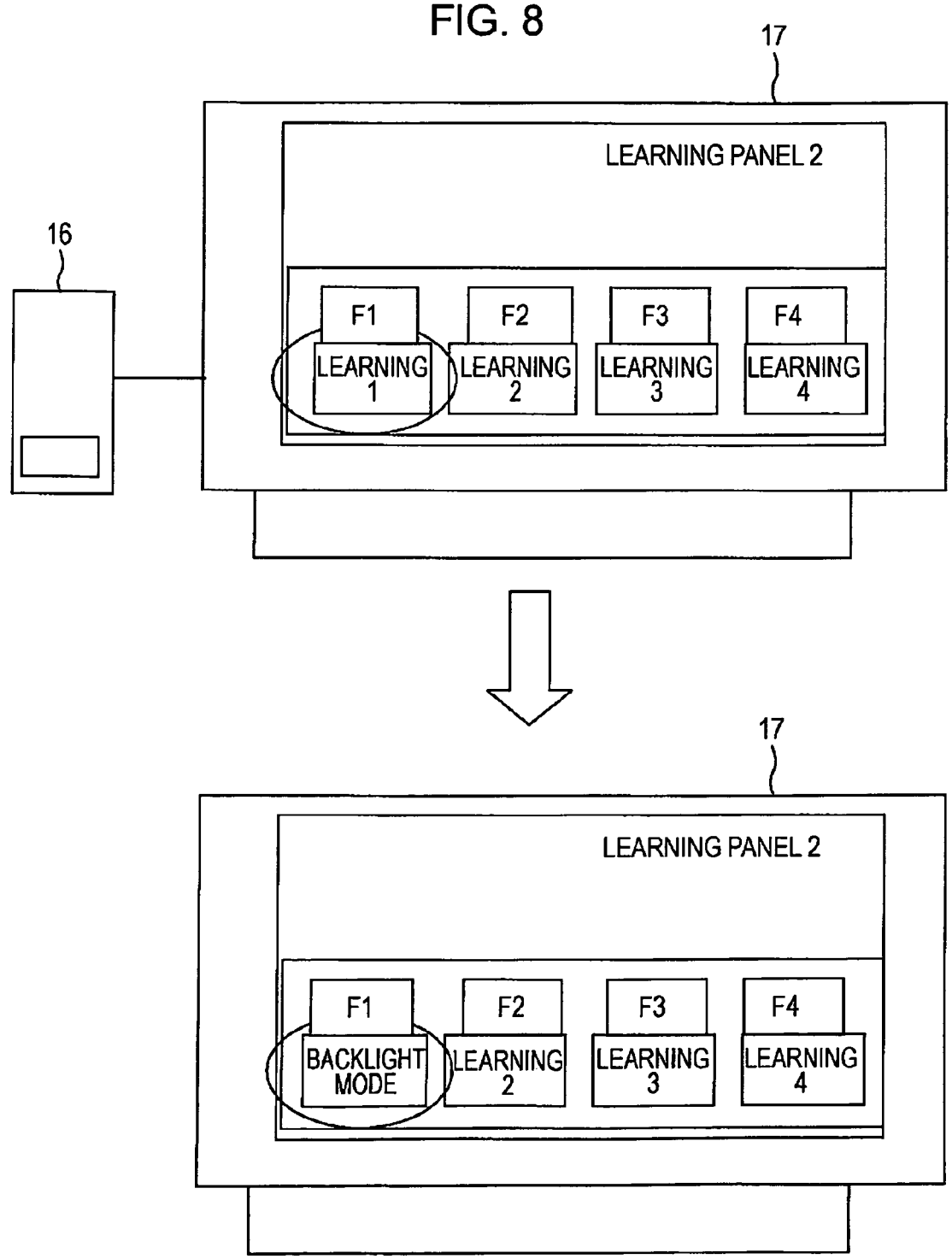
FIG. 8 is an illustration for explaining the learning processing.

The learning screen shown in FIG. 7 corresponds to the first page. Thus, "learning panel 1" is indicated on the learning screen shown in FIG. 7. The learning screen shown in FIG. 8 corresponds to the second page. Thus, "learning panel 2" is indicated on the learning screen shown in FIG. 8. For example, the user is able to allocate function 1 to the button 131-1 on the "learning panel 1" corresponding to the first page and allocate function 2 to the button 131-1 on the "learning panel 2" corresponding to the second page.

As described above, with the use of the learning feature, the user is able to allocate functions to the buttons 131-1 to 131-4. In addition, when the user operates the "display" button 121, the allocated functions are indicated in the field 152 on the GUI, as in the above-described embodiment.

Figure 9:
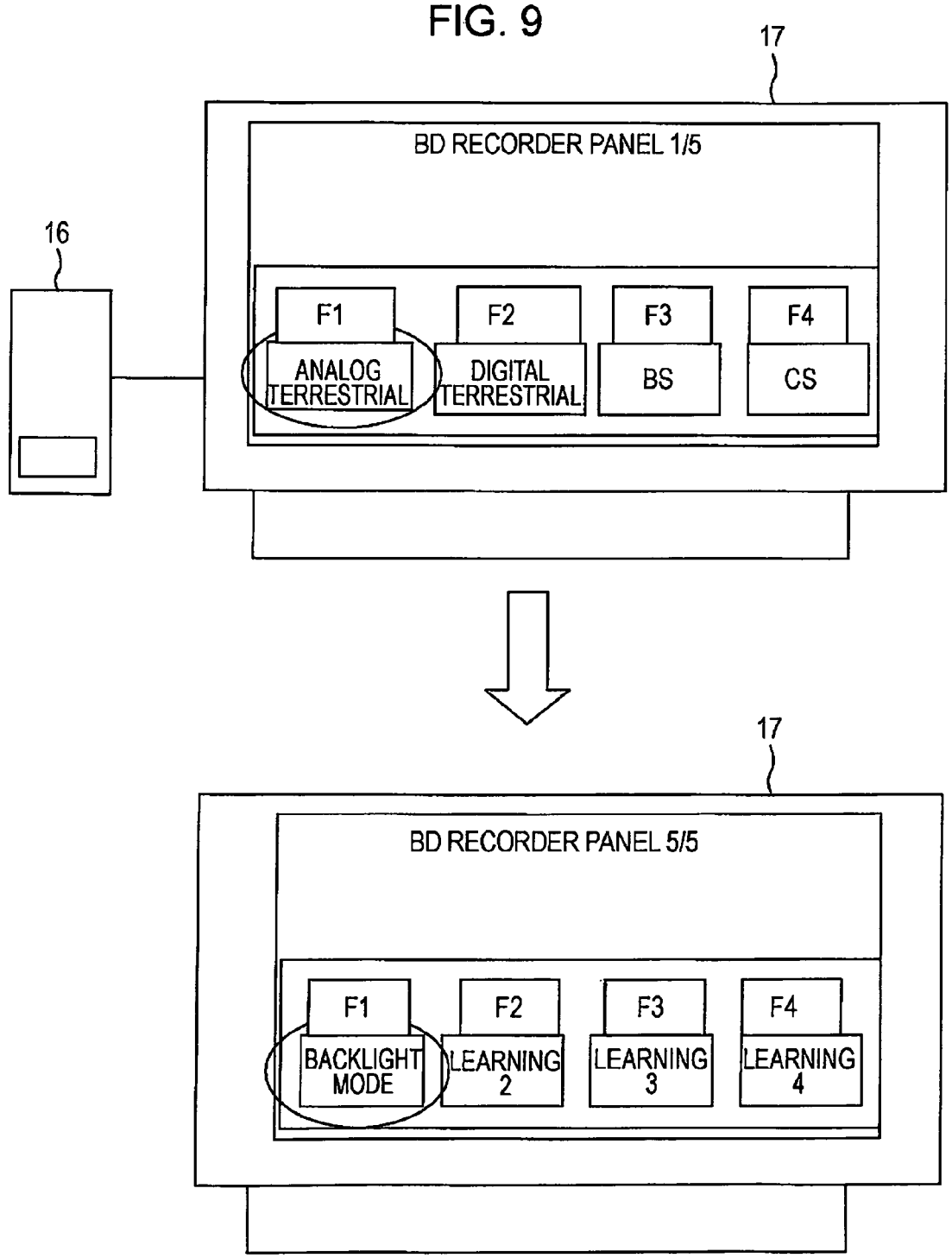
FIG. 9 is an illustration for explaining learning processing.

Learning processing for allocating additional functions, that is, functions other than already allocated functions, will be described. A state where functions that have already been set on the first page are indicated on a learning screen is shown in an upper drawing of FIG. 9. As is clear from the indication "panel 1/5", the learning screen shown in the upper drawing of FIG. 9 corresponds to the first page of five pages. On the first page of five pages, an "analog terrestrial broadcasting" function is allocated to the button 131-1 corresponding to "F1", a "digital terrestrial broadcasting" function is allocated to the button 131-2 corresponding to "F2", a "BS broadcasting" function is allocated to the button 131-3 corresponding to "F3", and a "CS broadcasting" function is allocated to the button 131-4 corresponding to "F4".

For example, the fifth page of five pages is prepared as a page on which the user is able to allocate other functions to the buttons 131-1 to 131-4. The user operates the "change" button 122 until "panel 5/5" is indicated. In a state where the learning screen corresponding to "panel 5/5" is being indicated, the user operates a button to which the user wants to allocate a desired function. In this case, for example, the user operates the button 131-1 of the remote control 18. A state where the user has performed an operation for allocating a "backlight mode" function to the button 131-1 is shown in a lower drawing of FIG. 9.

As described above, with the use of the learning feature, the user is able to allocate functions to the buttons 131-1 to 131-4 on a desired page. When the user operates the "display" button 121 and the "change" button 122 to reach the fifth page, the allocated functions are indicated in the field 152 on the GUI, as in the above-described embodiment.

As described above, learning can be carried out for each button and additional learning can be carried out for a desired button. In addition, the additionally programmed button can be used in a seamless manner with respect to an already set function.

The above-described series of processing, for example, generating and displaying GUIs, can be executed by hardware or software. In a case where the above-described series of processing is performed by software, a program constituting the software is installed from a program recording medium into a computer built in dedicated hardware or, for example, a general-purpose personal computer capable of performing various functions on the basis of various programs installed thereon.

FIG. 10 is a block diagram showing an example of the hardware configuration of a personal computer that performs the above-described series of processing on the basis of a program.

In the computer, a CPU 301, a ROM 302, and a RAM 303 are connected to each other via a bus 304.

An input/output interface 305 is connected to the bus 304. An input unit 306 including a keyboard, a mouse, and a microphone, an output unit 307 including a display and a speaker, a storing unit 308 including a hard disk and a non-volatile memory, a communication unit 309 including a network interface, a drive 310 for driving a removable medium 311, such as a magnetic disc, an optical disc, a magneto-optical disc, or a semiconductor memory, are connected to the input/output interface 305.

In the computer configured as described above, for example, when the CPU 301 loads the program stored in the storing unit 308 into the RAM 303 via the input/output interface and the bus 304 and executes the program, the above-described series of processing can be performed.

The program to be executed by the computer (the CPU 301) is stored in the removable medium 311, which is a package medium, such as a magnetic disc (e.g., a flexible disc), an optical disc (e.g., a compact disc read-only memory (CD-ROM) or a digital versatile disc (DVD)), a magneto-optical disc, or a semiconductor memory, or is provided using a wired or wireless communication medium, such as a local area network, the Internet, or digital satellite broadcasting.

When the removable medium 311 is inserted into the drive 310, the program can be installed into the storing unit 308 via the input/output interface 305. Alternatively, the program may be received at the communication unit 309 via the wired or wireless transmission medium and installed into the storing unit 308. Alternatively, the program may be installed in advance in the ROM 302 or the storing unit 308.

Based on the program, the computer does not necessarily perform the above-described series of processing in a time-series manner in accordance with the order described in this specification. The computer may perform the above-described series of processing based on the program in parallel or at necessary times, for example, when the above-described series of processing are invoked.

In addition, in this specification, the term system represents the entire equipment constituted by a plurality of devices.

Embodiments of the present invention are not limited to the above-described embodiments. Various changes and modifications can be made to the present invention without departing from the scope and spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
a first device to which external devices are connected;
a second device configured to transmit and receive data to and from the first device; and
a remote control provided for the second device,
wherein the remote control includes:
a plurality of buttons to which codes are allocated, the codes being different for each of the external devices; and
the second device includes:
storing means for storing, for each of the external devices, a table representing a relationship between the codes and the plurality of buttons of the remote control,
generating means for generating data of a graphical user interface in which are located a picture of the remote control and a first field, separate from the picture of the remote control, where button names corresponding to the codes allocated to the plurality of buttons of the remote control are indicated to identify which of a plurality of functions is performed upon operating a corresponding one of the plurality of buttons of the remote control, and
control means for performing, in response to a further button that is included in the remote control being operated so that a command to change the button names indicated in the first field is issued, control such that the codes allocated to the plurality of buttons are changed while the table stored by the storing means is referred to and that the button names indicated in the first field are changed to button names corresponding to the changed codes to identify which of a further plurality of functions is performed upon operating a corresponding one of the plurality of buttons of the remote control,
the graphical user interface generated by the generating means including a second field, separate from the picture of the remote control, which identifies a number of changes of button names that is available by operation of the further button of the remote control.

2. The information processing system according to claim 1, wherein the control means of the second device allocates, in response to a predetermined operation being carried out to enter a learning mode, an additional function to a selected one of the plurality of buttons of the remote control.

3. An information processing device that transmits and receives data to and from a device to which external devices are connected and that processes a signal transmitted from a remote control including a plurality of buttons to which codes are allocated, the codes being different for each of the external devices, the information processing device comprising:
storing means for storing, for each of the external devices, a table representing a relationship between the codes and the plurality of buttons of the remote control;
generating means for generating data of a graphical user interface in which are located a picture of the remote control and a first field, separate from the picture of the remote control, where button names corresponding to the codes allocated to the plurality of buttons of the remote control are indicated to identify which of a plurality of functions is performed upon operating a corresponding one of the plurality of buttons of the remote control; and
control means for performing, in response to a further button that is included in the remote control being operated so that a command to change the button names indicated in the first field is issued, control such that the codes allocated to the plurality of buttons are changed while the table stored by the storing means is referred to and that the button names indicated in the first field are changed to button names corresponding to the changed codes to identify which of a further plurality of functions is performed upon operating a corresponding one of the plurality of buttons of the remote control,
the graphical user interface generated by the generating means including a second field, separate from the picture of the remote control, which identifies a number of changes of button names that is available by operation of the further button of the remote control.

4. The information processing device according to claim 3, wherein the graphical user interface further has a field where an indication regarding an association between first button names of the plurality of buttons of the remote control and second button names of a plurality of buttons of a remote control dedicated to one of the external devices is provided.

5. The information processing device according to claim 3, wherein upon reception of a signal indicating that one of the plurality of buttons has been operated, the information processing device transmits, to the device to which a corresponding one of the external devices is connected, a code set at the present time for the operated button represented by the signal.

6. The information processing device according to claim 3, wherein a user sets the codes to be allocated to the plurality of buttons of the remote control.

7. The information processing device according to claim 3, wherein the codes to be allocated to the plurality of buttons of the remote control include a code set in advance for each of the external devices and a code to be additionally set by a user.

8. The information processing device according to claim 3, wherein the control means allocates, in response to a predetermined operation being carried out to enter a learning mode, an additional function to a selected one of the plurality of buttons of the remote control.

9. An information processing method for use in an information processing device that transmits and receives data to and from a device to which external devices are connected and that processes a signal transmitted from a remote control including a plurality of buttons to which codes are allocated, the codes being different for each of the external devices, the information processing method comprising:
storing, for each of the external devices, a table representing a relationship between the codes and the plurality of buttons of the remote control;
generating data of a graphical user interface in which are located a picture of the remote control and a first field, separate from the picture of the remote control, where button names corresponding to the codes allocated to the plurality of buttons of the remote control are indicated to identify which of a plurality of functions is performed upon operating a corresponding one of the plurality of buttons of the remote control; and
performing, in response to a further button that is included in the remote control being operated so that a command to change the button names indicated in the first field is issued, control such that the codes allocated to the plurality of buttons are changed while the table is referred to and that the button names indicated in the first field are changed to button names corresponding to the changed codes to identify which of a further plurality of functions is performed upon operating a corresponding one of the plurality of buttons of the remote control, the graphical user interface including a second field, separate from the picture of the remote control, which identifies a number of changes of button names that is available by operation of the further button of the remote control.

10. The information processing method according to claim 9, further comprising:

allocating, in response to a predetermined operation being carried out to enter a learning mode, an additional function to a selected one of the plurality of buttons of the remote control.

11. A processor encoded with a computer program for carrying out a method of controlling an information processing device that transmits and receives data to and from a device to which external devices are connected and that processes a signal transmitted from a remote control including a plurality of buttons to which codes are allocated, the codes being different for each of the external devices, the method comprising:

storing, for each of the external devices, a table representing a relationship between the codes and the plurality of buttons of the remote control;

generating data of a graphical user interface in which are located a picture of the remote control and a first field, separate from the picture of the remote control, where button names corresponding to the codes allocated to the plurality of buttons of the remote control are indicated to identify which of a plurality of functions is performed upon operating a corresponding one of the plurality of buttons of the remote control; and performing, in response to a further button that is included in the remote control being operated so that a command to change the button names indicated in the first field is issued, control such that the codes allocated to the plurality of buttons are changed while the table is referred to and that the button names indicated in the first field are changed to button names corresponding to the changed codes to identify which of a further plurality of functions is performed upon operating a corresponding one of the plurality of buttons of the remote control, the graphical user interface including a second field, separate from the picture of the remote control, which identifies a number of changes of button names that is available by operation of the further button of the remote control.

12. The processor according to claim 11, wherein the method further comprises:

allocating, in response to a predetermined operation being carried out to enter a learning mode, an additional function to a selected one of the plurality of buttons of the remote control.

13. A recording medium on which a computer program for carrying out a method of controlling an information processing device that transmits and receives data to and from a device to which external devices are connected and that processes a signal transmitted from a remote control including a plurality of buttons to which codes are allocated, the codes being different for each of the external devices is recorded, the method comprising:

storing, for each of the external devices, a table representing a relationship between the codes and the plurality of buttons of the remote control;

generating data of a graphical user interface in which are located a picture of the remote control and a first field, separate from the picture of the remote control, where button names corresponding to the codes allocated to the plurality of buttons of the remote control are indicated to identify which of a plurality of functions is performed upon operating a corresponding one of the plurality of buttons of the remote control; and performing, in response to a further button that is included in the remote control being operated so that a command to change the button names indicated in the first field is issued, control such that the codes allocated to the plurality of buttons are changed while the table is referred to and that the button names indicated in the first field are changed to button names corresponding to the changed codes to identify which of a further plurality of functions is performed upon operating a corresponding one of the plurality of buttons of the remote control, the graphical user interface including a second field, separate from the picture of the remote control, which identifies a number of changes of button names that is available by operation of the further button of the remote control.

14. The recording medium according to claim 13, wherein the method further comprises:

allocating, in response to a predetermined operation being carried out to enter a learning mode, an additional function to a selected one of the plurality of buttons of the remote control.

15. A remote control to be used in a system including a first device to which external devices are connected, a second device that transmits and receives data to and from the first device, and a display device connected to the second device, the remote control comprising:

a plurality of buttons to which codes are allocated, the codes being different for each of the external devices and being stored, for each of the external devices, in a table in the second device representing a relationship between the codes and the plurality of buttons;

a display button to be operated so that a graphical user interface in which are located a picture of the remote control and a first field, separate from the picture of the remote control, where button names corresponding to the codes allocated to the plurality of buttons of the remote control are indicated to identify which of a plurality of functions is performed upon operating a corresponding one of the plurality of buttons of the remote control, can be displayed on the display device; and a change button to be operated so that a command to change the button names indicated in the first field is issued such that the codes allocated to the plurality of buttons are changed while the table is referred to and the button names indicated in the first field are changed to button names corresponding to the changed codes to identify which of a further plurality of functions is performed upon operating a corresponding one of the plurality of buttons, the graphical user interface including a second field, separate from the picture of the remote control, which identifies a number of changes of button names that is available by operation of the further button of the remote control.

16. An information processing system, comprising:

a first device to which external devices are connected;

a second device configured to transmit and receive data to and from the first device; and a remote control provided for the second device, wherein the remote control includes
a plurality of buttons to which codes are allocated, the codes being different for each of the external devices, and wherein the second device includes
a storing unit configured to store, for each of the external devices, a table representing a relationship between the codes and the plurality of buttons of the remote control, a generating unit configured to generate data of a graphical user interface in which are located a picture of the remote control and a first field, separate from the picture of the remote control, where button names corresponding to the codes allocated to the plurality of buttons of the remote control are indicated to identify which of a plurality of functions is performed upon operating a corresponding one of the plurality of buttons of the remote control, and a control unit configured to perform, in response to a further button that is included in the remote control being operated so that a command to change the button names indicated in the first field is issued, control such that the codes allocated to the plurality of buttons are changed while the table stored by the storing unit is referred to and that the button names indicated in the first field are changed to button names corresponding to the changed codes to identify which of a further plurality of functions is performed upon operating a corresponding one of the plurality of buttons of the remote control, the graphical user interface generated by the generating unit including a second field, separate from the picture of the remote control, which identifies a number of changes of button names that is available by operation of the further button of the remote control.

17. The information processing system according to claim 16, wherein the control unit of the second device is configured to allocate, in response to a predetermined operation being carried out to enter a learning mode, an additional function to a selected one of the plurality of buttons of the remote control.

18. An information processing device that transmits and receives data to and from a device to which external devices are connected and that processes a signal transmitted from a remote control including a plurality of buttons to which codes are allocated, the codes being different for each of the external devices, the information processing device comprising:

a storing unit configured to store, for each of the external devices, a table representing a relationship between the codes and the plurality of buttons of the remote control;

a generating unit configured to generate data of a graphical user interface in which are located a picture of the remote control and a first field, separate from the picture of the remote control, where button names corresponding to the codes allocated to the plurality of buttons of the remote control are indicated to identify which of a plurality of functions is performed upon operating a corresponding one of the plurality of buttons of the remote control; and a control unit configured to perform, in response to a further button that is included in the remote control being operated so that a command to change the button names indicated in the first field is issued, control such that the codes allocated to the plurality of buttons are changed while the table stored by the storing unit is referred to and that the button names indicated in the first field are changed to button names corresponding to the changed codes to identify which of a further plurality of functions is performed upon operating a corresponding one of the plurality of the remote control, the graphical user interface generated by the generating unit including a second field, separate from the picture of the remote control, which identifies a number of changes of button names that is available by operation of the further button of the remote control.

19. The information processing device according to claim 18, wherein the control unit is configured to allocate, in response to a predetermined operation being carried out to enter a learning mode, an additional function to a selected one of the plurality of buttons of the remote control.

* * * * *